Mar. 13, 1923.
W. G. HAWKINS ET AL
ARMORED PNEUMATIC WHEEL
Original Filed Dec. 6, 1919
1,447,979
2 sheets-sheet 1
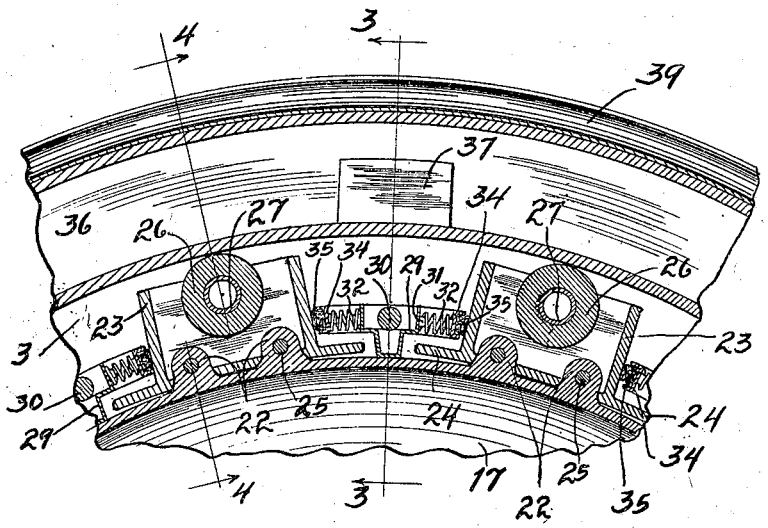
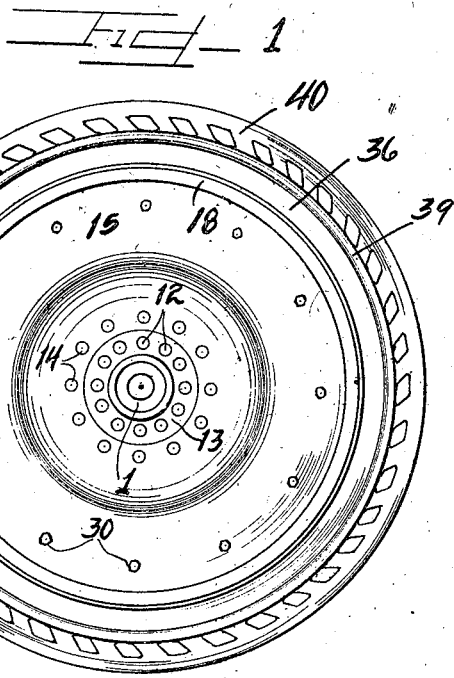
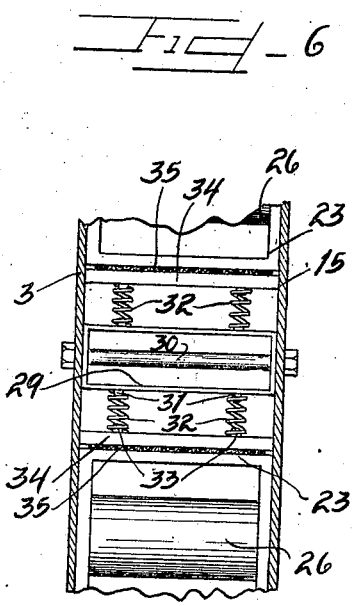
Witnesses
J. Loyd Ingram
Charles Bell Jr.
Inventor
William G. Hawkins
James F. Donnellan
Vivian G. Bloodgood
by Charles Geo Hills Atty

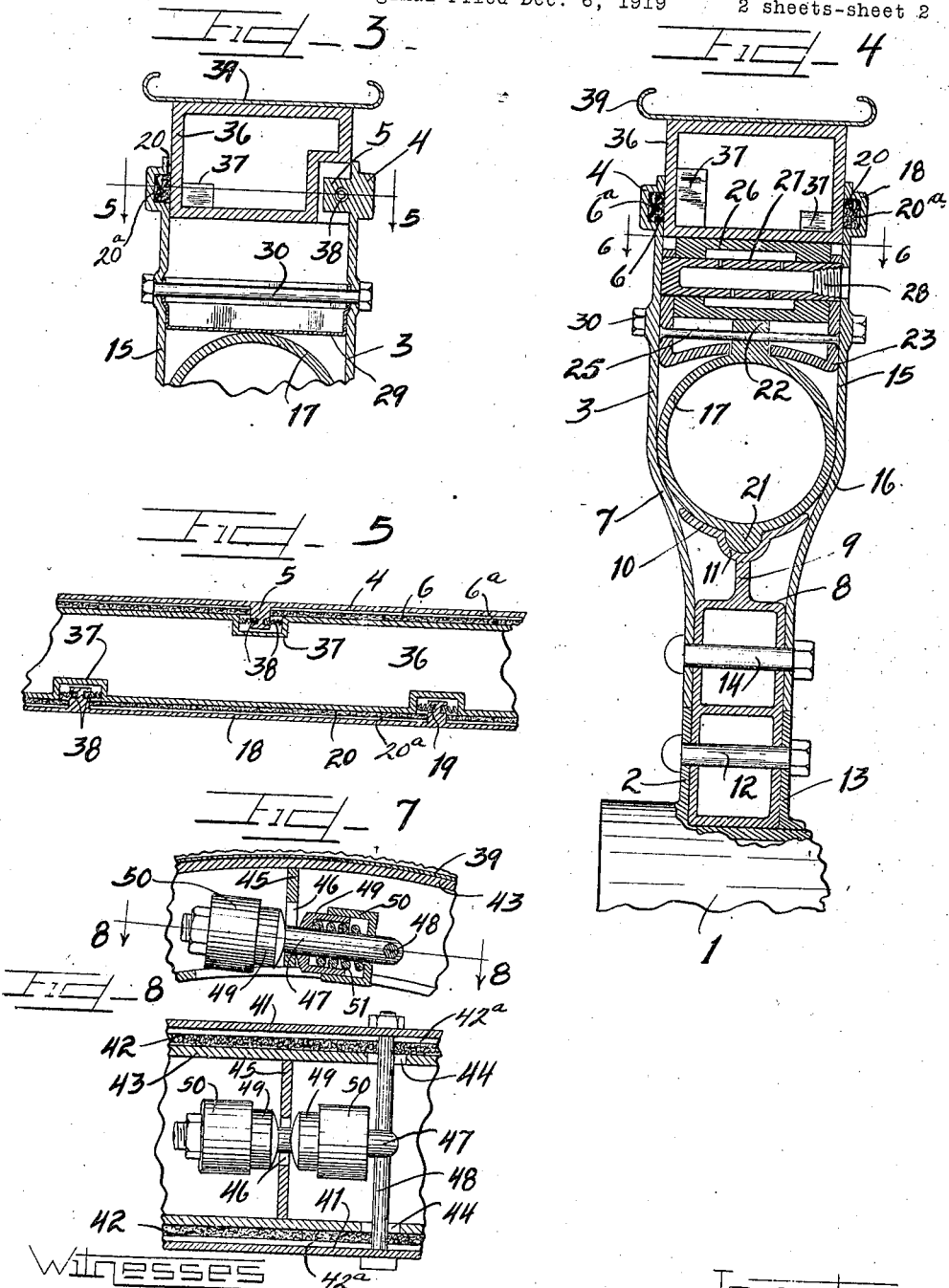

Patented Mar. 13, 1923.

1,447,979

UNITED STATES PATENT OFFICE.

WILLIAM G. HAWKINS AND VIVIAN C. BLOODGOOD, OF HARVEY, AND JAMES F. DONNELLAN, OF CHICAGO, ILLINOIS.

ARMORED PNEUMATIC WHEEL.

Application filed December 6, 1919, Serial No. 342,911. Renewed August 2, 1922. Serial No. 579,236.

*To all whom it may concern:*

Be it known that we, WILLIAM G. HAWKINS, VIVIAN C. BLOODGOOD, and JAMES F. DONNELLAN, citizens of the United States, and residents, respectively, of the village of Harvey, the village of Harvey, and the city of Chicago, in the county of Cook and State of Illinois, have invented certain new and useful Improvements in an Armored Pneumatic Wheel; and we do hereby declare that the following is a full, clear, and exact description of the same, reference being had to the accompanying drawings, and to the numerals of reference marked thereon, which form a part of this specification.

This invention relates more particularly to an improved type of an armored pneumatic wheel wherein an outer solid tire rim is adapted to interlock with and rest on rollers of an inner pneumatic rim and to be rotated by said inner rim.

It is an object of this invention to provide a wheel having a pneumatic inner rim, carrying roller mechanisms for supporting a solid tire outer rim which is spring cushioned and adapted to be driven by said inner rim.

Another object of the invention is to provide an armored vehicle wheel wherein concentric interfitting rims are separated by roller and spring mechanisms.

A further object of the invention is to provide a wheel wherein roller mechanisms are mounted on a pneumatic inner tire for the purpose of adjustably supporting a solid outer tread tire in position to be driven by the inner tire through spring members.

It is furthermore an object of this invention to provide a vehicle wheel wherein a pneumatic inner tube is separated from an outer solid tire rim section by rollers and springs to permit relative movement between the inner tube and said outer rim section.

It is an important object of this invention to provide a vehicle wheel having spring controlled rims, separated by roller mechanisms to permit a slight relative movement of said rims with respect to one another when the wheel is rotated.

Other and further important objects of this invention will be apparent from the disclosures in the specification and drawings.

The invention (in a preferred form) is illustrated in the drawings and hereinafter more fully described.

On the drawings:

Figure 1 is a side elevation of a vehicle wheel embodying the principles of this invention.

Figure 2 is a fragmentary detail section of the wheel taken in the plane of the wheel.

Figure 3 is a detail section taken on line 3—3 of Figure 2.

Figure 4 is a section taken on line 4—4, of Figure 2.

Figure 5 is a reduced section taken on line 5—5, of Figure 3.

Figure 6 is a section taken on line 6—6, of Figure 4.

Figure 7 is a fragmentary detail section of a wheel disclosing a modified form of spring cushioning mechanism disposed within the wheel felloe.

Figure 8 is a sectional view taken on line 8—8, of Figure 7, with parts in elevation.

As shown on the drawings:

The armored vehicle wheel comprises a hub 1, having integrally formed thereon an inner flange 2, on the periphery of which rests an inner disk 3, provided with an integral projecting channel 4, near the outer periphery thereof. Integrally formed at spaced intervals in the channel 4, are a plurality of projecting lugs 5. Seated in the disk channel 4, between the lugs 5, are crimp springs 6ª and strips of packing 6. As shown in Figure 4, the inner disk is deflected or curved at 7. Resting on the hub to one side of the inner flange 2, is a hollow rectangularly cross-sectioned filler ring 8, having integrally formed centrally at right angles on the outer peripheral surface thereof, a web or flange 9. A concave or dished inner rim or ring 10, is integrally formed on the filler flange 9. The dished rim 10, is provided with a recess or pocket 11.

Removably secured by bolts 12, on the hub 1, to the outside and contacting the filler ring 8, is an outer flange 13. Bolts 14, project through the inner disk 3, through the filler ring 8, and through apertures in an outer disk 15, to hold said outer disk secured in place. The outer disk 15, is curved at 16, and together with the curved portion 7 of the inner disk, and the concave rim 10 afford a seat or pocket for receiving a pneumatic rubber tube or tire 17. The outer disk 15, is provided with an integral projecting channel 18, near its outer periphery. Integrally formed in said channel 18, are a plurality of spaced inwardly projecting lugs 19, between which crimp springs 20$^a$ and strips of packing 20, are seated in the channel 18.

Integrally formed on the inner periphery of the pneumatic tire 17, is a lug or projection 21, which seats in the pocket 11, of the rim 10, to prevent creeping of the tire 17, with respect to said rim. Also integrally formed on the outer periphery of the tire 17, are a plurality of pairs of solid rubber lugs or projections 22, having openings therein. Disposed circumferentially around the tire 17, are a plurality of open boxes or shoes 23, each having a pair of openings in the curved bottom thereof. A flange 24, is integrally formed at each end of each of the shoes 23. As clearly shown in Figure 2, each shoe is positioned to permit a pair of the tire lugs 22, to project through the bottom openings thereof. To hold the shoes 23, in place pins or rods 25, project through the lugs 22, and have the ends thereof rigidly secured in the side walls of the shoes. A hollow roller 26, is disposed transversely in each shoe 23, and projects outwardly beyond the outer portion of the shoe. A hollow apertured self-oiling pin 27, projects through each roller, and has the ends thereof secured in the side walls of the shoe. Each roller pin 27, is closed at one end, and open at the other end. The open end of each pin 27, is internally threaded to removably receive a plug 28, threaded therein.

Disposed transversely of the wheel to the outside of the pneumatic tire 17, and between each pair of the shoes 23, is a hollow open spacer 29, the ends of which are apertured to permit a retaining bolt 30, to project therethrough and through the wheel disks 3 and 15, as shown in Figure 6. Integrally formed on each side of each spacer 29, are a pair of spaced projections or pins 31. A plurality of springs 32, are disposed to engage around the pins 31, while the other ends of said springs are connected or engaged around projections or pins 33, integrally formed on the back of long chambered packing holders 34, positioned on opposite sides of each spacer 29. Each holder 34, has a packing 35, seated therein and projecting therefrom to bear against the sides of the shoes 23. The springs 32, act to hold the packing 35, in contact with the sides of the shoes 23.

Movably engaged around the inner pneumatic rim section and resting on the rollers 26, and between the packing 6 and 20, of the wheel disks, is a hollow circular felloe 36, forming a part of an outer rim section. The felloe 36, is placed in position before the wheel disk 15, is secured in place. As shown in Figures 3 and 5, the felloe 36, is provided on each side with a plurality of housings or pockets 37, those on one side being staggered with respect to the pockets on the opposite side. The felloe pockets 37, are disposed to receive the lugs 5 and 19, of the disk channel members. Disposed in each pocket 37, on opposite sides of the lug projecting therein are two coiled springs 38. Rigidly secured on the outer peripheral surface of the felloe 36, is an outer tire rim 39, adapted to securely hold a solid rubber tire 40, in position.

Figures 7 and 8, disclose a modified form of a connecting mechanism for holding the outer rim in position to be driven from the disk portion of the wheel. The reference numeral 41, indicates wheel disk channels containing crimp springs 42$^a$ and packing 42. Engaged between the wheel disks and the packing 42 thereof, is a tubular felloe 43, the side walls of which are provided with oppositely disposed openings 44. Rigidly secured transversely within the felloe are a plurality of spaced partitions or plates 45, each having a slot or opening 46, therein. Cushion driving mechanisms connect the felloe with the disk portion of the wheel. Each cushion driving mechanism comprises a bolt 47, which projects through the partition slot 46, and is threaded on one end and provided with an opening in the other end. Projecting through the apertured end of the bolt 47, is a bolt 48, which projects through the felloe openings 44, and has the ends thereof secured in the disk channels 41. Mounted on the bolt 47, on each side of the partition 45, is a cushioning device embracing interfitting or telescoping cups 49 and 50, having a coiled spring 51, disposed therebetween and engaged around said bolt 47. The spring 51, acts to hold the cups extended with respect to one another.

The operation is as follows:

With the armored pneumatic wheel assembled as shown and described, it will be noted that if the wheel is mounted upon a vehicle axle in the usual manner, the weight of the vehicle will be supported by the portion of the outer solid tire 40, where it contacts the ground. The felloe 36, telescopes into the wheel disk section and acts to cause compression of the inner pneumatic tire or tube 17. The inner rim section is slidable between the disks 3 and 15, and together with the pneumatic tube serves as a cushion for resiliently supporting the weight of the vehicle, by the telescoping movement of the outer rim section into the disk section to compress the inner pneumatic rim section.

The spring-pressed packing strips 6 and 20, in the disk channels, form a tight joint with the wheel felloe and prevent dirt or other matter from entering the interior of the wheel. The springs 38, disposed between the felloe 36 and the wheel disks, permit a slight relative movement longitudinally between the felloe and the wheel disk section. To eliminate frictional action between the felloe and the inner rim, the rollers 26, are provided to act as roller bearings. The springs 32, positioned between the spacers 29, and the shoes 23, permit a slight relative movement longitudinally between the wheel disk section and the pneumatic inner rim section.

The inner pneumatic rim section acts to receive and absorb the shocks transmitted by the solid outer tire 40. As shown in Figure 4, the projection 21, seating in the pocket 11, of the rim 10, serves to prevent creeping of the pneumatic tire 17, on the rim 10. Both the pneumatic inner rim section and the outer rim section are resiliently connected with the disk section by means of the springs 32 and 38 respectively. The outer rim rests on the rollers 26, of the inner rim, and both of said rims are adapted to move radially and longitudinally between the wheel disks 3 and 15.

Figures 7 and 8, disclose a modified form of cushioning mechanism connected with the wheel disk section and the wheel felloe. The springs 51, within the telescoping cup members 49–50, are adapted to be compressed to permit a slight relative movement between the wheel disk section to which the bolts 48, are secured, and the wheel felloe 43, wherein the telescoping members are disposed to coact with the felloe partition, plates 46, through which the bolts 47, project. The wheel felloe is driven by the disk section through the medium of the spring cushioned telescoping members 49–50, and the mounting bolts 47 and 48.

We are aware that numerous details of construction may be varied through a wide range without departing from the principles of this invention, and we therefore do not purpose limiting the patent granted otherwise than necessitated by prior art and indicated by the claims.

We claim as our invention:

1. A vehicle wheel comprising a hub, a disk section supported thereon, an inner rim in said disk section, a pneumatic tube resting thereon, an outer rim, a solid tire secured thereto, a plurality of shoes secured circumferentially on said pneumatic tube, and rollers supported by said shoes and supporting the outer rim thereon.

2. A vehicle wheel comprising a hub, disks mounted thereon and spaced from one another, a pneumatic tube mounted between said disks, members secured on said tube, rollers supported in said members, means secured to said disks and disposed between said members, resilient mechanisms disposed between said members and means, a felloe supported on said rollers between said disks, a tire mounted on said felloe, and resilient members disposed between said felloe and said disks for rotating the felloe and said tire from said disks.

3. A wheel comprising a chambered disk element, a pneumatic tube mounted therein, shoes supported on said tube, rollers in said shoes and projecting therefrom, resilient means between said shoes and said disk element to permit relative movement between said disk element and said tube, a tread element supported on said rollers and interfitting with said disk element, and springs between said disk element and said tread element to rotate the tread element from the disk element.

4. An armored vehicle wheel embracing a hub, flanges secured thereon, an inner rim, means positioned between said flanges for supporting said inner rim, disks on said flanges and secured to said means, spring-pressed packing carried by said disks, a pneumatic tube on said inner rim, means for holding said tube from creeping on said inner rim, chambered shoes engaged on said tube, rollers mounted in said shoes, self-oiling members for supporting said rollers, spacers secured between said disks and between said shoes, a plurality of packing holders, packing therein contacting said shoes, springs positioned between said holders and said spacers, a felloe supported on said rollers, springs between said felloe and said disks, said disk packing contacting said felloe, an outer rim secured on said felloe, and a solid rubber tread tire secured in said outer rim.

In testimony whereof, we have hereunto subscribed our names in the presence of two subscribing witnesses.

WILLIAM G. HAWKINS.
VIVIAN C. BLOODGOOD.
JAMES F. DONNELLAN.

Witnesses:
LAWRENCE REITESTEIN.
EARL M. HARDINE.